United States Patent [19]
Takata et al.

[11] Patent Number: 4,565,186
[45] Date of Patent: Jan. 21, 1986

[54] PASSIVE-TYPE SOLAR DEVICE

[75] Inventors: Junzo Takata; Michio Jinushi; Mitsuo Hashizume, all of Kanagawa, Japan

[73] Assignees: Takenaka Komuten Co., Ltd., Osaka; Nankoso Ltd., Kanagawa, both of Japan

[21] Appl. No.: 657,362

[22] Filed: Oct. 3, 1984

[30]  Foreign Application Priority Data

Oct. 4, 1983 [JP]  Japan ................................ 58-185621
Oct. 4, 1983 [JP]  Japan ................................ 58-153875

[51] Int. Cl.$^4$ ............................................. E04D 13/18
[52] U.S. Cl. ........................................ 126/428; 126/419; 126/429; 126/431; 126/449; 126/441
[58] Field of Search .............. 126/428, 419, 429, 441, 126/449, 431

[56]  References Cited

U.S. PATENT DOCUMENTS

| 4,018,211 | 4/1977 | Barr | 126/439 |
|---|---|---|---|
| 4,296,733 | 10/1981 | Saunders | 126/428 |
| 4,313,420 | 2/1982 | Poeschl | 126/428 X |
| 4,375,216 | 3/1983 | Gessford | 126/441 X |
| 4,452,228 | 6/1984 | Meyer | 126/428 |

Primary Examiner—Larry Jones
Attorney, Agent, or Firm—Kalish & Gilster

[57]  ABSTRACT

A passive-type solar device comprising a transparent plate disposed for exposure to sunlight, a reflecting film curtain provided in alignment with said transparent plate and adapted for covering and uncovering movement with respect thereto, and a heat insulating, sunlight transmissible, board provided in alignment with said reflecting film curtain, said board comprising at least first and second sections of predetermined thickness in spaced apart relationship with an intervening air layer, each of said sections being constituted of a honeycomb material member sandwiched between transparent plates.

12 Claims, 6 Drawing Figures

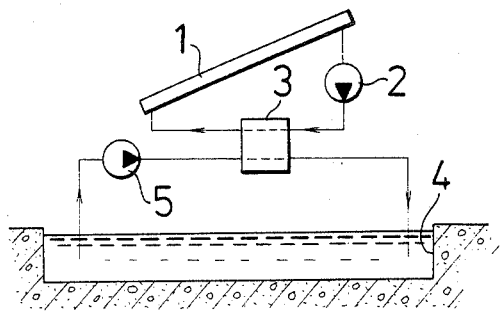
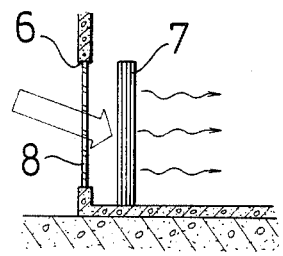
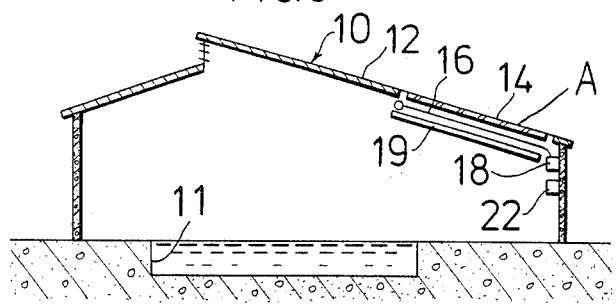
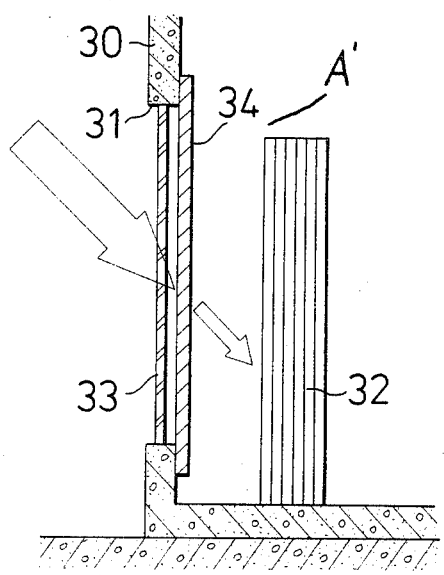

PASSIVE-TYPE SOLAR DEVICE

BACKGROUND AND SUMMARY OF THE INVENTION

The present invention relates to a passive-type solar device. More particularly, the present invention relates to a passive-type solar device which effectively causes introduction of sunrays to the interior of a building; permits control of the amount of solar heat to be received indoors; and also provides a natural lighting of a room.

For indoor swimming facilities which have a substantial thermal storage capacity, a conventional solar collector system, of the type illustrated in FIG. 1, has been used as a means to absorb solar heat effectively and thereby raise the temperature of the pool water. Such a system generally comprises a heat-collector 1 mounted on a roof of a building, a pump 2 to circulate the refrigerant heated by the collector 1, a heat exchanger 3 connected to the refrigerant-circulatory system, and another pump 5 linking the heat exchanger 3 with the heated swimming pool 4.

A solar system of this character is effective for warming the water of a pool, but is inefficient in raising the temperature of a room and indoor surface walls thereof. Another drawback to this system is that it does not permit natural light to enter the room.

As a means for raising the temperature of a room and indoor surface walls effectively, a passive-type solar collector has been customarily employed. FIG. 2 illustrates a conventional solar collector of this type which consists of a heat-accumulating member 7 made of concrete or the like and set inside the window of a building. According to this system the sunrays passing through a window glass 8 strike heat-accumulating member 7 so that the solar heat accumulates therein and radiation heat therefrom warms the room.

Such passive-type solar collector, however, has a drawback in that the heat-accumulating member 7 does not permit light to pass therethrough nor does it allow sunlight to enter the building interior. Furthermore, such heat accumulating member 7 does not function to prevent heat loss, especially in a cloudy winter day when the indoor heat transfers through the window glass due to cold radiation, cold draft, or overall heat transmission.

The present invention is to eliminate the above defects. The primary object of the present invention is to provide a passive-type solar device which makes it possible to introduce sunlight to the interior of a building directly and effectively so that it may warm same and the water of a swimming pool located therein; to control the amount of solar heat to be absorbed indoors depending on the change of weather, seasons, day, and night; to provide natural lighting to the interior; and further to reduce loss of radiation heat.

Another object of the present invention is to provide a heat-insulating board for a passive-type solar collector, which is effective in heat-insulation and therefore can reduce indoor heat loss, and also does permit sunlight to enter into a room.

It is a still further object of the present invention to provide a heat-insulating board for a passive-type solar collector which operates to reduce heat loss, especially in a cloudy winter day due to cold radiation, cold draft and overall heat transmission, and also allows sunlight to enter a room.

To achieve the above objects, the passive-type solar device according to the present invention essentially consists of a transparent board set in the roof of a building angled to the vertical for accepting sun rays, a reflecting film curtain disposed beneath the transparent board and which is adapted for opening and closing, and a light-transmittable, heat-insulating board which is disposed beneath the reflecting film curtain and is also adapted for opening and closing. The heat-insulating board for a passive-type solar collector of the present invention is comprised of a plurality of board components of honeycomb material of predetermined thickness with the opposite surfaces thereof being covered by a transparent plate and with such components being arranged in spaced apart relationship with an intervening air layer of predetermined thickness.

BRIEF DESCRIPTION OF THE DRAWINGS

FIG. 1 is a schematic view of a conventional heat collector system, as above described, illustrating a building having a swimming pool therein.

FIG. 2 is a schematic view of a conventional passive-type solar collector, as above discussed.

FIG. 3 is a vertical sectional view, of generally schematic character, illustrating a building having a swimming pool therein and which building is equipped with a passive-type solar device constructed in accordance with and embodying the present invention.

FIG. 6 is a schematic view partially in section illustrating a passive-type solar collector of the present invention illustrating the application of the same for building interior heating.

PRACTICAL EMBODIMENTS OF THE PRESENT INVENTION

Figure 4:
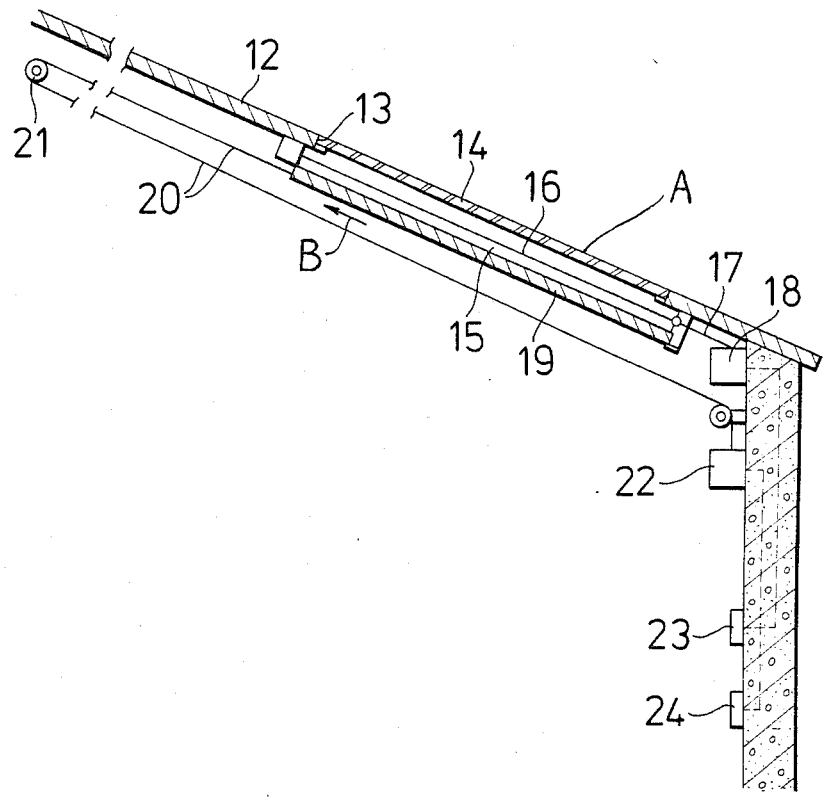
FIG. 4 is a fragmentary enlarged sectional view of the building illustrated in FIG. 3 showing in greater detail components of the solar device of the present invention.

Referring now by reference characters to the drawings which illustrate practical embodiments of the present invention, and with particular reference to FIGS. 3 and 4, 10 indicates a building provided with a heated swimming pool 11 in the floor thereof. A skylight or window 13 (FIG. 4) is formed in the slanting roof 12 of said building 10, the inclination of said roof providing an angulation for impingement of sun rays thereon. Window 13 is provided with a passive-type solar device A which includes a transparent plate 14 about 6.8 mm thick and made of wire glass. Under transparent plate 14 there is provided a vacuum-evaporated, reflecting film curtain 16 fabricated preferably of aluminum and adapted for opening and closing as will be described below.

Curtain 16 presents a means to control the amount of sunlight in summer season and also to reduce heat loss. It is dimensioned to cover the lower surface of transparent plate 14 entirely and is so mounted that it may be rolled up automatically towards the opening side thereof. The opposite end of curtain 16 is connected to an elongated flexible member such as a rope 17 which may be rolled up by an electric motor 18 mounted inside building 10 causing curtain 16 to be extended in closing condition.

Additionally, beneath curtain 16 there is provided a light-transmissible heat-insulating board 19 planarwise parallel with transparent plate 14, there being an air layer of 600–800 mm in thickness between same. Heat-insulating board 19 is of dimensions substantially equal to that of transparent plate 14, and is supported by a guiderail, or the like, (not shown) in such a manner that it may be presented in open or closed relationship to window 13. The upper end portion of heat-insulating board 19 which is thus planarwise inclined at substantially the same angle as transparent plate 14, is connected to one end of a rope 20 which extends about a pulley 21 and thence progresses in the opposite direction for connection to a motor 22 through operation of which said board 19 may be optionally opened or closed. Thus forward rotation of motor 22 causes rope 20 to coil whereby heat-insulating board 19 slides into opening direction; and when motor 22 rotates in an opposite direction, board 19 moves in the opposite or closing direction through its own weight. 23, 24 indicates respectively operational switches for starting and stopping electric motors 18 and 22.

Figure 5:
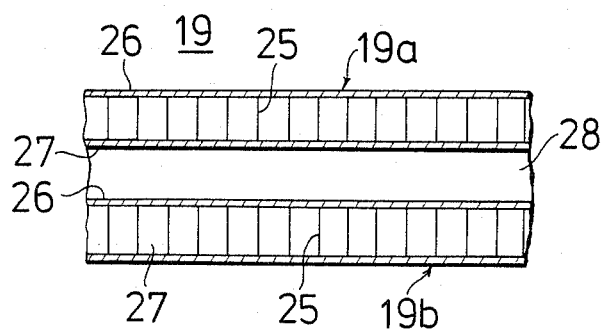
FIG. 5 is a sectional view illustrating the heat insulating board of the present invention.

FIG. 5 is a partial sectional view showing in detail the structure of the heat-insulating board 19, which consists of a pair of sandwich-like boards 19a, 19b separated by an intervening air layer approximately 6 mm thick; said sandwich-like boards 19a, 19b being constituted of a honeycomb material section 25, approximately 6 mm in thickness tightly engaged between polycarbonate plates 26, 27.

With a passive-type solar device A having the construction as explained above, in order to permit sunlight to enter and warm the room during good weather, it is necessary to roll up, into open condition, curtain 16 and then cause rope 20 to be coiled by forward rotation of the electric motor 22 which starts upon pushing of switch 24 whereby heat-insulating board 19 may be moved upwardly into open condition, in the direction of the arrow B (FIG. 4). By such operation, sunlight enters building 10 through transparent board 14 and elevates the indoor temperature effectively.

On the contrary, in cloudy weather, electric motor 22 is rotated reversely so that board 19 may be closed. But natural ambient light can enter building 10 through transparent plate 14 and heat-insulating board 19, with the result that the interior of building 10 can be illuminated to some degree by the natural lighting. It should be noted here that the sunlight transmission ratio of the heat-insulating board 19 is about 20%. The closing of heat-insulating board 19 can prevent heat from escaping to the outside through the same and transparent plate 14.

During the nighttime in winter, the vacuum-evaporated aluminum curtain 16 and the heat-insulating board 19 are closed. In this case, heat loss, or the amount of heat which escapes through the passive-type solar part, is relatively reduced.

During the daytime in summer, the vacuum-evaporated aluminum curtain 16 is closed, and such prevents the inside of building 10 from being overheated.

The heat-transmission ratio K of a simple pane of wire glass is 5.4 Kcal/m$^2$.deg. The heat-transmission ratio K when the heat-insulating board 19 is closed is 1.14 Kcal/m$^2$.deg. Furthermore, when both said vaccum-evaporated aluminum curtain 16 and heat-insulating board 19 are closed, the ratio K is 0.94 Kcal/m$^2$.deg.

According to the present invention, the following effects can be obtained:

(a) The heat-collecting capacity of device A when sunshine is directly introduced indoors with heat-insulating board 19 and reflecting film curtain 16 are open is equal to that which is obtained when a flat-type solar collector is used.

(b) When the heat-insulating board 19 is closed, it is possible to obtain total heat-transmission ratio K of 1.14 Kcal/m$^2$.deg. at the solar device. This means that the present invention can bring about a better heat-insulating effect than an ordinary roof.

(c) It is possible to permit entry of light even in the condition wherein heat-insulating board 19 is closed.

(d) It is possible to maintain excellent indoor conditions and to save energy, because the heat-insulating board 19 is controllable depending upon whether or not the sun is shining; whether or not is it necessary to allow entry of sunlight; or because of the change between day and night or from season to season.

(e) The use of curtain 16 permits control of the amount of sunlight to be introduced indoors during the summer season.

Referring now to FIG. 6, an example of the heat-insulating board 19 of the present invention as applied to a passive-type solar collector will now be described. 30 indicates a building, having a window 31; a passive-type solar collector A' comprising a heat-accumulating member made of concrete or the like 32; a window glass 33; and a heat-insulating board 34; said latter being arranged so that is covers the entirety of window 31 and being adapted to open and close. It should be noted that a structural explanation of heat-insulating board 34 is omitted as it is of the same structure as of heat insulating board 19, above described.

According to the solar collector A' having the arrangement and components as mentioned above, solar heat is accumulated in the heat-accumulating member 32, with the radiation heat from the member 32 warming the room. In this case, heat-insulating board 34 is provided inside the window glass 33 is opened so that direct sunlight may strike heat-accumulating member 32 through window glass 33 whereby heat-accumulating member 32 is heated and the heat is accumulated therein.

In cloudy, winter weather or during nighttime in winter, window 31 is covered with heat-insulating board 34. As the outside natural light can pass through and heat-insulating board 34, it is possible to render the room bright to a reasonable extent by natural lighting. It should be noted that the sunray-transmission ratio of the heat-insulating board is approximately 20%. Thus closing of heat-insulating board 34 greatly reduces the amount of the heat that radiates to the outside through the same and window glass 33.

For example, the heat-transmission ratio K in case of a single pane of window glass is 5.4 Kcal/m$^2$.deg., whereas the K value when the heat-insulating board 34 is provided is 1.14 Kcal/m$^2$.deg. It will be seen that board 34 can materially reduce the heat loss.

Heat-insulating board 34 according to the present invention as used in solar device A is not only heat-insulation effective enough to lessen but also is additionally advantageous in that it can transmit light into a room for natural lighting. Such attributes result from the unique construction of said board 34, that is, by reason of the plurality of sandwich-like boards with an intervening air layer about 6 mm thick; said sandwich-like boards being produced by disposing a honeycomb material section tightly between transparent plates.

What we claim is:

1. A passive-type solar device comprising a heat transmissible transparent plate disposed for exposure to sunlight, a reflecting film curtain presented spacedly beneath said plate and being substantially coextensive therewith, means for effecting disposition of said reflecting film curtain between aligned or transparent plate-closing position and withdrawn or transparent plate-open condition, a light transmissible, heat-insulating board provided spacedly beneath and in alignment with said transparent plate wherein said heat-insulating board comprises at least two honeycomb material sections of predetermined thickness, transparent plates sandwiching each honeycomb material section, said sections being spaced-apart for creating an air layer of predetermined thickness, and means integrating said sections together with the intervening air layer into a unitary board, and means for effecting movement of said board between alignment with said transparent plate and withdrawn or non-transparent plate aligned condition.

2. A passive-type solar device as claimed in claim 1, wherein said transparent plate is made of wire glass.

3. A passive-type solar device as claimed in claim 1, wherein said reflecting film curtain and said transparent plate are in mutually spaced apart condition with an air layer therebetween.

4. A passive-type solar device as defined in claim 1 wherein said heat-insulating board comprises a plurality of heat-insulating units.

5. A passive-type solar device as defined in claim 1 wherein said reflecting film curtain is vacuum evaporated.

6. A passive-type solar device as defined in claim 1 wherein the light transmissible heat-insulating board is planarwise parallel with said transparent plate, and with there being a spacing between 600 to 800 mm therebetween.

7. For use with a building having a roof inclined for acceptance of sun emissions, a window-forming opening provided in said roof, a heat transmissible transparent plate provided in said opening, a reflecting film curtain provided interiorly of said building and spacedly beneath said transparent plate, said film curtain being substantially coextensive with said plate, means for effecting disposition of said reflecting film curtain between aligned or transparent plate-closing position and withdrawn, or transparent plate-opening position, a light transmissible, heat-insulating board provided spacedly beneath said reflecting film curtain and in alignment with said transparent plate wherein said heat-insulating board comprises at least two honeycomb material sections of predetermined thickness, transparent plates sandwiching each honeycomb material section, said sections being spaced-apart for creating an air layer of predetermined thickness, transparent and means intergrating said sections together with the intervening air layer into a unitary board, and means for effecting movement of said board between alignment with said transparent plate and withdrawn or non-transparent plate aligned condition.

8. The invention as described in claim 7 and further characterized by said transparent plate being fabricated of wire glass.

9. The invention as described in claim 8 wherein said reflecting film curtain is of vacuum-evaporated film construction.

10. The invention as defined in claim 9 wherein said heat insulating board is light transmissible and fabricated of a plurality of honeycomb material sections, each of said sections being sandwiched between transparent boards fabricated of polycarbonate, said sandwiched honeycomb material sections being spaced apart approximately 6 mm and means maintaining said sandwich components in integrated character.

11. The invention as defined in claim 7 wherein said heat-insulating board comprises a plurality of heat-insulating units.

12. For use with a building construction having an outside wall with a window-forming opening provided therein, a passive-type solar collector comprising a heat and light transmissible transparent plate provided in said opening, a heat insulating board disposed interiorly of said transparent plate and being of substantially equal or greater dimensions thereof, means for effecting movement of said heat-insulating board between aligned, planarwise parallel spaced apart relationship with said transparent plate for opening thereof and withdrawn condition for effecting opening of said transparent plate, a heat-accumulating member disposed interiorly of said heat insulating board in aligned planarwise parallel, spaced apart relationship to said heat insulating board when the latter is in transparent plate-closed condition, said heat insulating board being comprised of a plurality of honeycomb material sections, plate members being disposed upon each honeycomb material section in sandwich-form relationship thereto, adjacent sandwiched honeycomb material sections being spaced apart for defining therebetween an air layer of predetermined thickness, and means maintaining sandwich-forming honeycomb material sections in integrated character.

* * * * *

UNITED STATES PATENT AND TRADEMARK OFFICE
CERTIFICATE OF CORRECTION

PATENT NO. : 4,565,186

DATED : January 21, 1986

INVENTOR(S) : Junzo Takata et al

It is certified that error appears in the above-identified patent and that said Letters Patent is hereby corrected as shown below:

Claim 7, column 6, line 5, after "thickness," delete "transparent";

same claim, line 6, change "intergrating" to ---integrating---.

Signed and Sealed this

Sixth Day of May 1986

[SEAL]

Attest:

DONALD J. QUIGG

Attesting Officer

Commissioner of Patents and Trademarks